Patented Nov. 21, 1922.

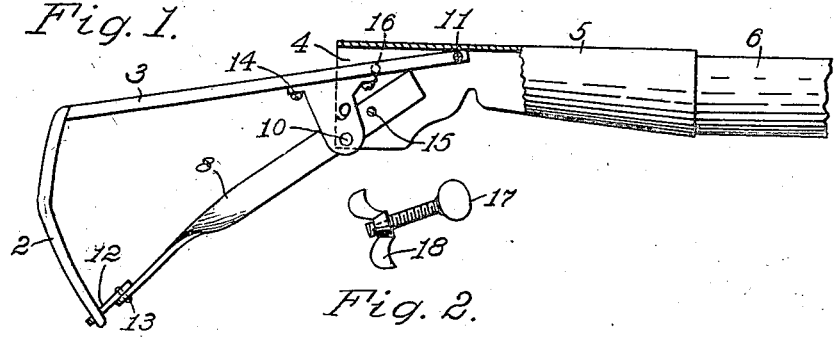
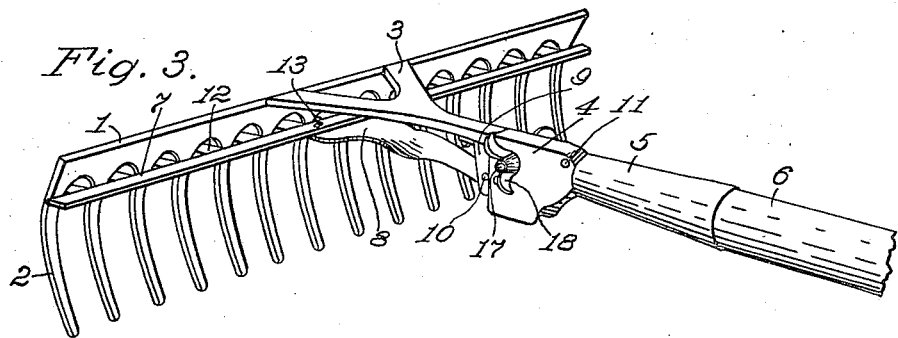
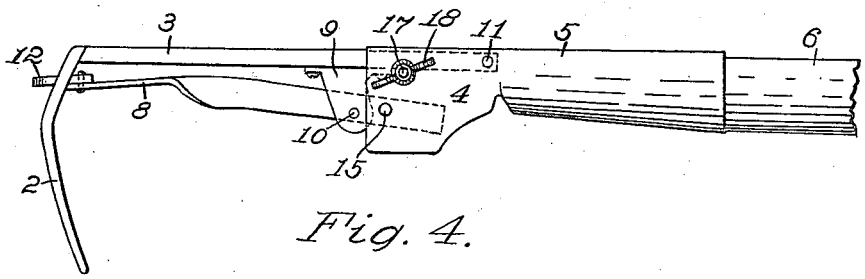

1,436,189

UNITED STATES PATENT OFFICE.

CLAUDE MOORE, OF CEDAR RAPIDS, IOWA.

CONVERTIBLE SELF-CLEANING RAKE.

Application filed December 20, 1920. Serial No. 432,131.

*To all whom it may concern:*

Be it known that I, CLAUDE MOORE, a citizen of the United States of America, and a resident of Cedar Rapids, Linn County, Iowa, have invented certain new and useful Improvements in Convertible Self-Cleaning Rakes, of which the following is a specification.

My invention relates to improvements in convertible self-cleaning rakes, and the object of my improvement is to combine, with an implement of this description, suitable releasable means for securing the self-cleaning element thereof in an inoperative position.

This object I have accomplished by the means which are hereinafter described and claimed, and which are illustrated in the accompanying drawings, in which Fig. 1 is a view partly in side elevation, and partly in longitudinal section, of said device, with parts removed or broken away, and Fig. 2 is a detail view of the removable fastening means used to hold the sweep in an inoperative position. Fig. 3 is a perspective view of the device with the handle broken away, and said releasable fastening means in use thereon, and Fig. 4 is a side elevation of the device and said fastening means shown in said Fig. 3.

Similar numerals of reference denote corresponding parts throughout the several views.

My improved convertible self-cleaning rake comprises a rake-head 1 having a plurality of spaced depending teeth 2 and having an angularly directed shank 3. 6 is the rake handle provided with a socket or hollow holder 5 fixed thereon, whose outer end is made open below with the sides spread apart to provide a housing member 4 whose opposite walls have alined transverse orifices 16 so the received shank 3 may be brought into line above the inserted removable fastening bolt 17 having thereon a wing-nut 18. The extremity of the shank 3 is pivotally mounted on a transverse pintle 11 fixed across said housing 4. The numeral 7 denotes a sweep arranged parallel with said rake-head 1 and having short teeth 12 which traverse the interspaces of the rake-teeth. This sweep is rigidly mounted and secured by means of rivets 13 to one end of a shank 8 whose rear end is pivotally mounted on a pintle 15 fixed across said housing 4. 9 is a depending bracket secured by screws 14 to the lower face of the shank 3 of the rake-head. The shank 8 is pivoted at 10 to the lower end of the bracket 9 immediately forward of the pintle 15.

When the bolt 17 has been removed, the two shanks 3 and 8 have each limited swinging movements. The limited swinging movement of the shank 3 and rake-head 1 gives the latter a desired flexibility while in use gathering relatively bulky substances like grass and brush, the latter pressing upwardly the sweep 7. This also presses upwardly the shank 3 by reason of the pivotal connection at 10 of the other shank 8 to its bracket 9, so that in the extreme upward positions of both shanks, they meet with firm support against the top part of the housing 4. When the rake is lifted from the ground, the relatively heavy sweep, with its connected part, is sufficient to cause it to swing downwardly to the position shown in Fig. 1, the teeth 12 clearing the interspaces of the teeth 2 of the rake of adherent material.

When the bolt 17 is inserted through the orifices in the housing 4 under the shank 3 when lifted up and secured by the wing-nut 18, the rake-head is held firmly and rigidly against the top of the housing, and the sweep is also retained in its uppermost position, as shown in Figs. 3 and 4. The device is thus easily converted into an ordinary rake.

Having described my invention, what I claim as new, and desire to secure by Letters Patent, is:

1. A convertible self-cleaning rake, comprising in combination, a toothed rake-head having a shank, a hollow holder in which said shank is pivoted for limited swinging movements, a sweep having teeth traversing the interspaces of the rake-teeth and having a shank pivotally connected to both said rake-head shank and to said holder for limited swinging movements relative to each, and removable means for releasably locking said rake-head rigidly to said holder.

2. A convertible self-cleaning rake, comprising in combination, a toothed rake-head having a shank, a hollow holder in which said shank is pivoted for swinging movements, a sweep having teeth traversing the interspaces of the rake-teeth and having a shank pivotally connected to said rake-head shank, said holder having alined transverse orifices positioned immediately below said rake-head shank when lifted, a locking bolt removably inserted in said orifices, and a fastening-nut on said bolt.

Signed at Waterloo, Iowa, this 30th day of November, 1920.

CLAUDE MOORE.